Jan. 22, 1952  G. RILLING  2,583,494
EDUCATIONAL DEVICE EMBODYING A PLURALITY OF RELATIVELY MOVABLE
ALPHABETIC SHAPES FOR FORMING LETTERS OR WORD COMBINATIONS
Filed May 23, 1949
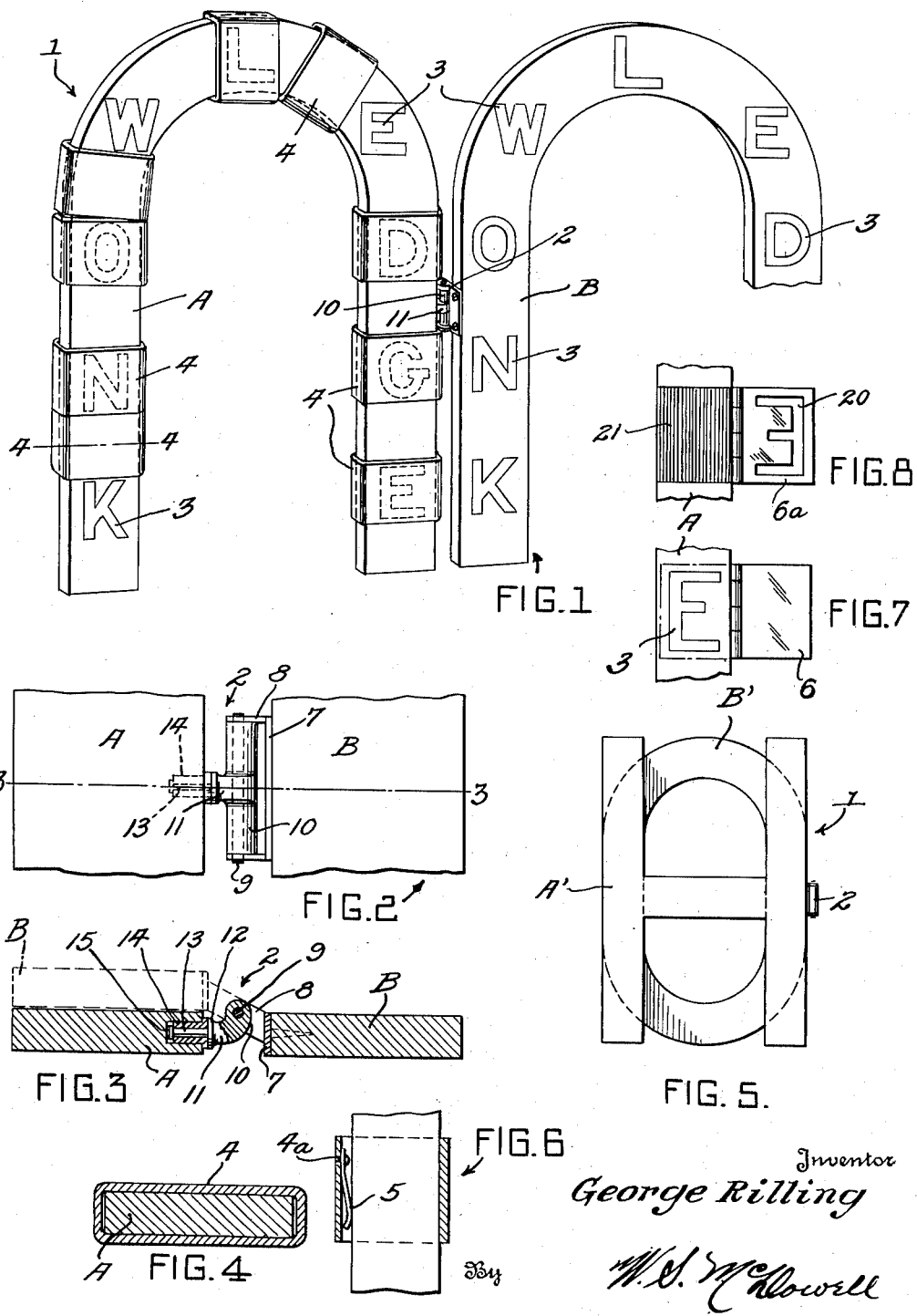
Inventor
George Rilling
By W. S. McDowell
Attorney Patented Jan. 22, 1952

2,583,494

UNITED STATES PATENT OFFICE 2,583,494

EDUCATIONAL DEVICE EMBODYING A PLURALITY OF RELATIVELY MOVABLE ALPHABETIC SHAPES FOR FORMING LETTERS OR WORD COMBINATIONS

George Rilling, Anna, Ohio

Application May 23, 1949, Serial No. 94,885

1 Claim. (Cl. 35—71)

This invention relates to educational appliances, and has for an object to provide a simple physical device adapted to be exhibited before children particularly for the purpose of facilitating an explanation of early studies in arithmetic, spelling and other elementary subjects.

Another object of the invention is to provide teachers, lecturers or others engaged in orally addressing school classes or groups of people with means in the form of a physical exhibit or chart for enabling the teacher's or lecturer's discourse to be more readily understood by a group of listeners.

For a further understanding of the invention, reference is to be had to the following description and the accompanying drawing, wherein:

Fig. 1 is a perspective view of a speaker's exhibit formed in accordance with the present invention;

Fig. 2 is a fragmentary detail elevational view disclosing the universal type hinge connection employed in uniting the two main sections of the device forming the present invention in assembled relationship;

Fig. 3 is a transverse sectional view taken on the plane disclosed by the line 3—3 of Fig. 2;

Fig. 4 is a similar view on the line 4—4 of Fig. 1;

Fig. 5 is a detail front elevational view of a modified form of my improved device;

Fig. 6 is a detail view of a still further modified form of my invention in which the slidable indicia masking members are provided with resilient position-maintaining means;

Fig. 7 is a fragmentary view disclosing a modified form of masking device for concealing and revealing indicia present on the exhibit;

Fig. 8 is a similar view disclosing a further modification of the masking device.

Referring more particularly to the drawings, the numeral 1 designates my improved educational device in its entirety. In one of its adaptations, the device is used as an exhibit for facilitating an understanding of oral addresses. Particularly, in addressing children or young persons, it is advantageous for a speaker to have a model or other physical device to produce a clear understanding on the part of listeners of a theme being developed by a speaker.

To provide such a device, the present invention employs a unit which in a preferred embodiment may simulate an arch. The body may be composed of one or more sections. In this instance, two of such sections, indicated at A and B, have been disclosed, the same being joined by a hinge, or other similar flexible uniting means, indicated at 2.

On one or both faces of each of these sections, there may be arranged at appropriately spaced intervals letters of the alphabet, or other desired indicia, as indicated at 3. When a speaker using the device begins an address, the letters or other locally applied indicia are covered or concealed from the view of the audience by a plurality of sliding masking sleeves 4, or their equivalent. Usually, as the speaker begins his address, he moves one of the sleeves to a position uncovering one of the letters appearing on one or both of the units, and as his address proceeds, the letters are successively uncovered, so that in this instance, the word "knowledge," present on each of the sections, will appear to the view of the listeners when all the individual sleeves have been moved to assume letter-uncovering positions. Normally, the spacing of the individual letters on each section is such that the masking sleeves may be slidably moved to occupy positions on the sections between said letters so that the latter may be clearly viewed without being obscured by the sleeves.

The sleeves may be formed from fiber, paper, paperboard or the like so that they may conform closely to the cross-sectional configuration of the sections on which they are mounted, a close-fitting relationship being established so that the sleeves will retain, through frictional engagement with the sections, their positions of adjustment. As shown in Fig. 6, this action also may be obtained, particularly when the sleeves are formed from hard rigid materials such as metal or molded plastics, by providing each of the sleeves indicated at 4a with resilient devices in the form of leaf springs 5, the free ends of the latter pressing frictionally on adjoining edges of said sections.

In lieu of sliding sleeves, the plates may be hingedly mounted, as indicated at 6 in Fig. 7, for movement between positions covering and exposing the informative designs, letters, numerals or other material applied on the sections of the device.

Preferably, the sections are detachably coupled in joined relationship in a manner providing for swinging and turning movement thereof by the hinge means indicated at 2. While such a union may partake of any one of several forms, the construction shown in the drawing comprises a U-shaped bracket 7 which is fastened to the section B along one edge thereof. The bracket includes apertured laterally and angularly directed ears 8 in which are received the ends of a hinge pin 9. Turnable on the pin 9 between the ears 8 is a ferrule 10. Midway of its length, the ferrule 10 is formed with a curved offset region 11 which terminates in a collar 12 and a stud 13, the latter being received in a longitudinally extending opening formed in a metallic thimble 14 which is removably positioned in a socket 15 provided in the section A.

By virtue of this hinge connection, the sections may be extended relative to each other to occupy the positions thereof disclosed in Fig. 1 and in full lines in Fig. 3. By reference to the latter figure, it will be noted that, if desired, the section B may be folded backwardly upon and into registry with the section A. Such a folded position of the section B has been disclosed by broken lines in Fig. 3, wherein the sleeves 4 have been removed from the sections to permit the same to be folded into parallel abutting relation. It will be understood that with the sleeves 4 applied to the sections, the latter may be folded backwardly upon one another, but due to the thickness of the sleeves, the sections will not lie in exactly parallel planes, but will closely approach parallelism. Also, the sections may be rotated relative to one another about the longitudinal axis afforded by the stud 13, or the sections may be relatively separated and disconnected from one another by completely withdrawing the thimble 14 from the socket 15.

In Fig. 1, the sections of the device have been shown as being of inverted U-shape configuration. It is obvious that this configuration may be varied and one of such possible variations has been illustrated in Fig. 5, wherein the section A' partakes of the form of the letter H and the section B' of the letter O. Many of such variations may be utilized.

In Fig. 8, a variation of the invention has been set forth in which the masking plate 6a is provided with cut-out or stenciled symbols 20. When the plate 6a is moved to a position in which it is in registry with the body A, the colored or shaded surface region 21 of the body A may be seen through the symbol stencil 20, since the region 21 possesses a coloration contrasting with that of the outer surfaces of the plate 6a.

Various other changes may be made in the construction of the device without departing from the spirit and scope of the invention as the latter has been set forth in the following claim.

I claim:

An educational device for use by teachers and lecturers comprising a plurality of bodies each having an alphabetic shape; coupling means connecting said bodies and providing for relative swinging movement thereof between an outwardly spread position wherein said bodies are arranged in a common plane and folded positions wherein said bodies are arranged in superposed substantially parallel planes, said coupling means also providing for relative rotation of said bodies; indicia-forming means carried on each of said bodies; and means movably carried on each of said bodies for rendering said indicia-forming means visible or invisible to an audience.

GEORGE RILLING.

REFERENCES CITED

The following references are of record in the file of this patent:

UNITED STATES PATENTS

| Number | Name | Date |
|---|---|---|
| 706,528 | Christian | Aug. 12, 1902 |
| 711,240 | Zaring | Oct. 14, 1902 |
| 2,126,373 | Emanuel | Aug. 9, 1938 |